March 8, 1966   H. L. MAHL, JR., ET AL   3,238,670
APPARATUS FOR DEFOLIATING BY VAPORIZING AND APPLYING AMMONIA
Filed May 16, 1963

INVENTORS
Harry L. Mahl, Jr.
Herman A. Remmert

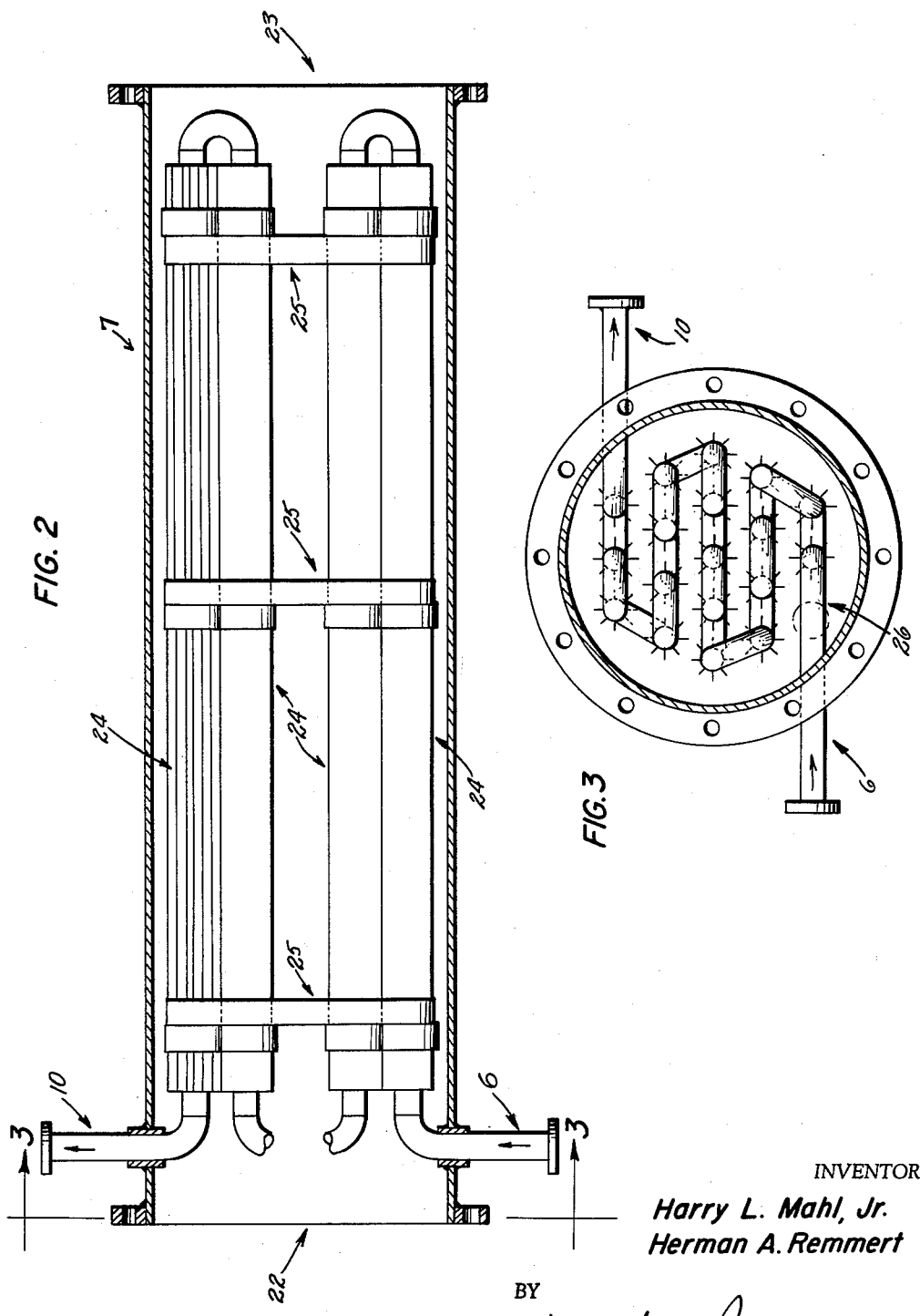

3,238,670
APPARATUS FOR DEFOLIATING BY VAPORIZING AND APPLYING AMMONIA
Harry L. Mahl, Jr., Wilmington, N.C., and Herman A. Remmert, Memphis, Tenn., assignors to W. R. Grace & Co., New York, N.Y., a corporation of Connecticut
Filed May 16, 1963, Ser. No. 280,988
1 Claim. (Cl. 47—1.7)

This invention relates to the vaporization of liquid ammonia. In one specific aspect it relates to a portable ammonia vaporizer for preparing gaseous ammonia suitable for use in treating row crops.

In summary, this invention involves a portable ammonia vaporizer so designed as to vaporize liquid ammonia completely and super heat the resulting gas to about 35–200° C. without cracking appreciable quantities of ammonia. Hot combustion gases, prepared by burning propane (or other suitable fuel, e.g., liquid petroleum gas) in air, are mixed with quenching air, at ambient temperature, in such ratio as to maintain the temperature of the resulting mixture within the range of about 400–435° C. thereby avoiding higher temperatures conducive to thermal cracking of ammonia. This mixture of hot gases is fed into the shell of a heat exchanger while feeding anhydrous ammonia, to be vaporized, into the heat exchanger's tubes. The temperature of the superheated ammonia exiting the heat exchanger is maintained in the range of about 35–200° centigrade by adjusting the rate of flow of propane or the like to the burner thereby regulating the amount of heat supplied to the system. Our invention makes it possible to feed ammonia continuously or intermittently into an elongated contacting device at constant or variable rates ranging from about 2 pounds per acre to upwards of about 300 pounds per acre while moving the contacting device lengthwise along a crop row. This flexibility makes it practical to add ammonia vapor to row crops, on a commercial scale, for such diverse purposes as defoliation and foliar fertilization.

In the drawings:

FIGURE 2 shows the heat exchanger in plan section.

FIGURE 3 shows the heat exchanger in section taken along the line 3—3 of FIGURE 2.

Figure 1:
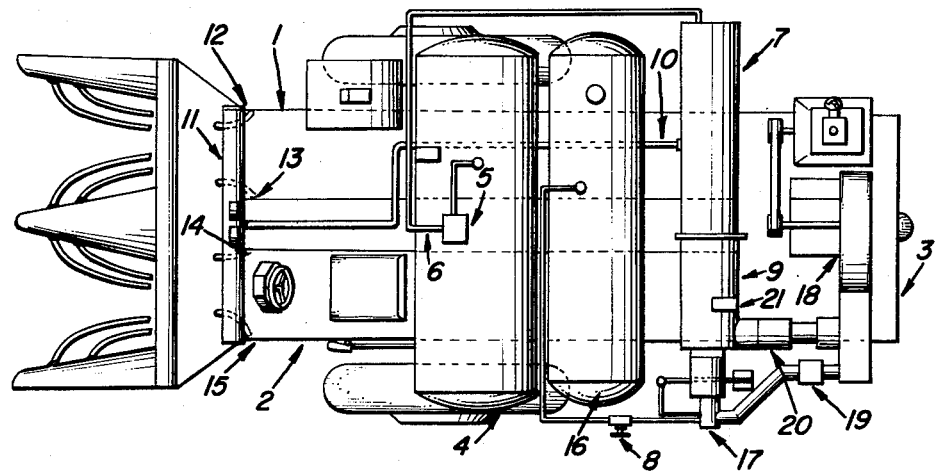
FIGURE 1 shows a plan view of a tractor-mounted ammonia dofoliator equipped with the ammonia vaporizer of this invention.

Preferred embodiments of our invention include the use of at least about 600% excess air to hold the temperature of the combustion gas-air mixture entering the heat exchanger's shell at about 425° C. and the use of such quantity of propane feed as is necessary to maintain ammonia gas exiting the vaporizer within the temperature range of about 35–70° C. We also prefer to construct the heat exchanger tubes from type 316 stainless steel to avoid the possibility of scaling and to minimize the loss of ammonia by thermal cracking.

The ammonia vaporizer of this invention is of special utility on tractor mounted ammonia defoliators, such as those used for the defoliation of cotton and other row crops; such defoliators are well known and can be readily modified to use the ammonia vaporizer of this invention.

In the ammonia defoliation of row crops it is extremely important to deliver ammonia at a steady pre-determined rate and at a pre-determined temperature. Otherwise defoliation will be erratic and/or overly expensive. The advantages of defoliation equipment capable of these functions will be best understood in the light of the present status of chemical defoliation, as discussed below.

Leaves on the stalks of row crops and on weeds growing with these crops are a handicap to harvesting, because leaves and leaf juices interfere with the functioning of mechanical harvesters and cause the accumulation of trash in the harvested crops. As a result, considerable interest has developed in the defoliation of row crops before harvesting. Defoliation of cotton has received the most attention with the result that cotton defoliation has become a matter of great economic importance. The defoliation of other row crops, especially soy beans, including weeds growing in the bean fields, is receiving increased attention.

In the commercial growing of cotton it has been necessary to make several pickings by hand, because all the bolls do not ripen at the same time. Bolls on the lower branches mature first, and opening of bolls on the upper branches occurs over a period of several weeks after the lower bolls have matured. In recent years, the shortage and cost of labor and the trend toward large scale farming have made mechanical picking very desirable. The presence of leaves on cotton stalks is an especially severe handicap to mechanical harvesting, because leaves present a barrier which hampers the picking means from reaching the bolls, and add trash to the cotton. Also, if green leaves are rubbed against the cotton, juices are exuded and stain the cotton fibers. Thus, it is highly desirable that the leaves be removed from cotton plants before harvesting the crop mechanically.

If the leaves of a plant are injured by physical or chemical means, or if they are cut leaving stems, abscission layers of cells grow across the petiole bases causing the leaves or leaf stems to drop off. In the case of cotton, the formation of abscission layers disrupts the metabolic processes of the plants and causes the upper bolls to ripen and open more rapidly, thereby facilitating the use of mechanical pickers.

Although cotton defoliation is of special value when mechanical pickers are used, it also aids hand picking, because the dew dries out quicker permitting the pickers to get an earlier start, and it is easier for the pickers to locate the bolls and gather the cotton when the plants are free of leaves.

Leaf removal also helps control the insect count. This is particularly true in respect to aphids, leaf worms, and boll weevils. Since defoliation speeds up cotton harvesting, the stalks can be destroyed earlier. This is advantageous in areas that have plow-up programs to aid in the control of boll weevils.

To obtain the best results with cotton, the boll load should be heavy and vegetative development stopped. Normally, about 50%–70% of the bolls should open before a chemical defoliant is applied. Little damage to to the crop will occur if most of the bolls are full size and firm to the touch at the time of defoliation. If the bolls are not full size and are soft when the plants are defoliated, the yield will be reduced and seed and fiber quality will be lowered.

At the present time most defoliants are contact herbicides which caused defoliation when applied at low rates. At slightly higher rates these materials produce rapid desiccation and killing of leaves, stems, and other plant parts before the abscission layers form. Desiccation is very objectionable with cotton, because leaves of dead plants set so firmly that few of them drop, boll development ceases, abscission of the boll occurs, and the plant stems become brittle so that bolls are easily broken off and lost during harvesting. When legumes are desiccated, large numbers of seed pods drop off. Cyanamide compounds, organic phosphorus compounds, arsenic compounds, and chlorates are the principal defoliants used at the present time. Cyanamide is difficult to use because it requires a considerable amount of dew or other moisture. Practically no defoliation occurs when this material is applied in the absence of moisture. Arsenic and phosphorus compounds are poisonous, and chlorates leave phytotoxic residues in the soil. Furthermore, irregular defoliation is obtained with these materials, and defoliation is seldom more than about 60–75% complete. There is known the treatment of cotton plants with hot combustion gases to produce defoliation. A process of this type is extremely difficult to use, because the temperature must be controlled very closely. If the gas is too cool, little or no defoliation will be obtained; if it is too hot, desiccation or boll abscission will result. Various devices have been suggested for mechanically removing foliage from cotton plants. Although the use of such devices increases the efficiency of cotton picking to a limited extent, only partial defoliation has been obtained with these machines.

It is an object of the present invention to provide a means for defoliating row crops after the crop is made, whereby the plants and weeds growing with them will be rendered substantially free of leaves so that the crops may be harvested mechanically or by hand to yield products that contain little trash and are free of leaf stain.

It has recently been discovered that contact with gaseous ammonia will cause the defoliation of plants. However, previous attempts to defoliate plants with gaseous ammonia have been characterized by spotty results, an average defoliation of about 75%, and high ammonia usage accompanied by a high ammonia loss. In addition to constituting a danger and annoyance to the operator requiring him to use a fresh air mask and protective clothing, the escaping ammonia was a hazard to all animal life and a hindrance to defoliation. In the experimental work leading to the design of this heat exchanger, it was found that ammonia enters plants through the stomata. It was also found that ammonia in concentrations too low to produce defoliation will close the stomata thus rendering the exposed plants insensitive to defoliation when contacted subsequently with ammonia in concentrations sufficiently high to defoliate normal plants. It was also found that the direct application of liquid ammonia to plant leaves burns the leaves at the point of contact but does not produce appreciable defoliation.

Ammonia, $NH_3$, is an article of commerce. Although this compound is a gas at normal temperature and pressure, it is stored and transported as a liquid in pressure vessels. Ammonia melts at −77.70° C. and boils at −33.35° C. at an absolute pressure of one atmosphere; its heat of vaporization is 283.6 calories per gram at 20° C. When heated to a sufficiently high temperature ammonia dissociates into hydrogen and nitrogen. The temperature at which dissociation commences depends upon the composition of the material with which the ammonia is in contact. In experimental work leading to the design of this ammonia vaporizer it was found that ammonia is stable in the presence of type 316 stainless steel at temperatures up to about 470° C.

It was discovered in work leading to this invention that previous poor defoliation was caused, in part, by improper temperature control in the ammonia vaporizing system. At times the temperature was too high with the result that a considerable portion of the ammonia was cracked to yield hydrogen and nitrogen which do not cause defoliation. At other times the vaporizer's temperature was too low. This resulted in incomplete vaporization of ammonia with the concomitant feeding of part of the ammonia as large drops of liquid which burn leaves at the point of contact but do not produce defoliation.

We have designed an ammonia vaporizer which has overcome these difficulties. Our invention permits the continuous or intermittent feeding of gaseous ammonia into a contacting device at constant or variable rates ranging from as low as about two pounds per acre to upward of about 300 pounds per acre while the contacting device moves lengthwise along a crop row. The flexibility of our invention makes it practical to add ammonia vapor to row crops, on a commercial scale, for such diverse purposes as defoliation and foliar fertilization. Furthermore, this flexibility of control is necessary, because the ammonia feed must be cut off when turning at the end of rows or when stopping to service or repair the contacting system. So far as is known, there is no device available in the prior art for accomplishing these results.

The method which we prefer for defoliating row crops with ammonia comprises passing superheated gaseous ammonia from our ammonia vaporizer into an elongated contacting zone, or hood, of conventional design while passing this device lengthwise along the crop row when the stomata are open. The plants are thereby exposed to a gas comprising a defoliating atmosphere of ammonia. Ammonia rates of about 40–120 pounds per acre have been satisfactory for defoliating row crops, while rates less than about 30 pounds per acre have failed to produce acceptable defoliation. Application at slightly lower rates, e.g., about 20 pounds or less per acre has been found to shock plants thereby closing their stomata and rendering the shocked plants insensitive to defoliation. This period of insensitivity may last for 6–10 hours or longer. When defoliating cotton plants with gaseous ammonia under optimum conditions leaves on plants exiting the contacting zone are considerably lighter green than those of untreated plants. This indicates that ammonia attacks chlorophyll. Within about 15–30 minutes the treated leaves develop a bronze color, and in about 2–6 hours they feel dry when touched. After 8–14 days substantially all of the leaves have dropped from the plants. This treatment does not kill the plants; new leaves develop in a few weeks.

FIGURE 1 shows our ammonia vaporizer and auxiliary equipment, including two elongated contacting zones 1 and 2, mounted on a tractor 3. Liquid ammonia from cylinder 4 passes through feed regulator 5 into line 6 and then into the tubes of heat exchanger 7 where it is vaporized. The temperature of superheated ammonia exiting the tubes of the heat exchanger is maintained in the range of about 35–70° C. by adjusting the setting of valve 8 which regulates the flow of fuel to burner 17 thereby regulating the amount of heat supplied to the heat exchanger from the burner via quenching chamber 9. Gaseous ammonia from the heat exchanger goes via line 10 to manifold 11 and then into elongated contacting zones 1 and 2 through ports 12, 13, 14 and 15. Heat is supplied to the vaporizer by the combustion of liquid petroleum gas from cylinder 16 in burner 17 with air furnished by blower 18 via line 19. The hot combustion gas from burner 17 enters quenching chamber 9 where it is mixed with air entering the system from blower 18 through line 20. The preferred temperature of the resulting combustion gas-air mixture, measured at control point 21, is about 450° C. The hot mixture of combustion gas and air goes from quenching chamber 9 into the shell of heat exchanger 7 from which, after heating the tubes therein, the gas mixture is vented to the atmosphere.

The construction of the heat exchanger portion of our apparatus is illustrated further by FIGURES 2 and 3. FIGURE 2, a cut away schematic side view of the shell, reveals the arrangement of the finned tubes 24 and bands 25 therein. Liquid ammonia, which may be flashing, enters the heat exchanger through line 6, and ammonia vapor leaves through line 10. The hot combustion gas-air mixture enters the shell at entrance 22 and leaves at exit 23. FIGURE 3 shows the heat exchanger in section taken along line 3—3 at the end from which the combustion gas-air mixture enters the heat exchanger's shell. FIGURE 3 shows that the direction of ammonia flow from entrance 6 to exit 10 prevents vapor locking within the finned tubes of the heat exchanger, because neither gaseous ammonia nor liquid ammonia flows downward in the system. Tube 26 is a dummy incorporated into the system to eliminate downward flow.

In a preferred embodiment of this invention the portable apparatus for vaporizing liquid ammonia comprises, in combination, (a) a heat exchanger comprising a shell having an entrance and an exit, a tube bundle within said shell formed from a single elongated tube with longitudinal fins and a plurality of turns, each turn rising higher in the bundle than the preceding turn, said tube entering the shell from the bottom and leaving the shell at the top, (b) a quench chamber communicating directly with said shell entrance, (c) means for forming a hot gas-air mixture comprising a fuel burner to provide combustion gas, a conduit feeding said combustion gas to said quench chamber, and means for blowing ambient air into said quench chamber, said means for blowing said air communicating with said quench chamber.

Work leading to the design of our apparatus showed that stainless steel type 316 is a preferred material for use in fabricating tubes for the heat exchanger, because it has practically no catalytic effect on the thermal cracking of ammonia at temperatures below about 435° C. It was decided, as a result of this discovery plus the knowledge that type 316 stainless steel does not scale when heated in the presence of air, to construct the ammonia vaporizer's tubes from type 316 stainless steel. Actual field use of the apparatus has confirmed our expectation that neither ammonia cracking nor scale formation is a problem when vaporizing ammonia in our apparatus. Other materials suitable for use in constructing tubes for the heat exchanger include, but are not limited to, Hastelloy C, Monel, Inconel, and Hastelloy B. The compositions of Hastelloy C, Monel, Inconel, and Hastelloy are well known and are listed in the 1950 edition of "Chemical Engineers' Handbook," John H. Perry, Editor, McGraw-Hill Book Company, Inc., pp.1529–1530. Said handbook lists the following as the compositions of the above-named trademarked materials: Hastelloy B, Ni; 24–32 Mo; 3–7 Fe; 0.02–0.12 C. Hastelloy C, Ni; 14–19 Mo; 4–8 Fe; 0.04–0.15 C; 12–16 Cr; 3–5.5 W. Inconel, 79.5 Ni; 13 Cr; 6.5 Fe; 0.08 C; 0.2 Cu; 0.25 Mn. Monel, 67 Ni; 30 Cu; 1.4 Fe; 0.1 Si; 0.15 C. While carbon steel has little tendency to catalyze the thermal cracking of ammonia below about 450° C., scaling is a problem with this material.

*Example I*

The equipment used was that illustrated in FIGURE 1. Flashing liquid ammonia was fed into our vaporizer at a rate of about 75 pounds per acre while moving the device along cotton rows at about 4 miles per hour. The ammonia vaporized smoothly and substantially completely. Cracking of ammonia was not a problem for the temperature control was such as to substantially preclude the thermal decomposition of ammonia. No visible droplets of liquid ammonia were observed in vapor fed into the elongated contacting zone. Leaves of plants exit the contacting zone were lighter green than those of untreated plants, and most of the treated leaves turned bronze within about 30 minutes after being contacted with ammonia. After about 3 hours the treated leaves felt dry when touched. Defoliation was ca.≅95%, i.e., at least about 95%, complete 8 days after treatment.

*Example II*

This run was made to determine the efficiency of our vaporizer at two ammonia rates considerably higher than any found necessary to obtain substantially complete defoliation of row crops. At first ammonia was fed into the vaporizer at a rate of about 130 pounds per acre while moving the apparatus along cotton rows at about 4 miles per hour; subsequently the ammonia rate was increased to about 240 pounds per acre. In both instances, vaporization of the ammonia was substantially complete, and temperature control substantially precluded cracking. Defoliation of the treated cotton plants was, in both instances, ≅ca. 96% complete after 10 days.

*Example III*

This run was made to determine the efficiency of our ammonia vaporizer at an ammonia rate known to be too low to defoliate cotton. Flashing liquid ammonia was fed into the vaporizer at the rate of about 10 pounds per acre while moving the apparatus along cotton rows at about 4 miles per hour. Vaporization was substantially complete and temperature control substantially precluded cracking. As expected, no defoliation resulted from this treatment. The effect was therefore a closely controlled foliar fertilization.

*Example IV*

Using the apparatus illustrated in FIGURE 1, a field of soy beans infested with cockleburs was treated with ammonia. The ammonia feed rate was about 90 pounds per acre while the apparatus moved along the crop rows at about 4 miles per hour. Vaporization was observed to be substantially complete, and temperature control substantially precluded cracking of the ammonia. Defoliation of both beans and weeds was ca.≅96% complete about 7 days after applying the ammonia.

What is claimed:

In an ammonia defoliator comprising vehicle mounted crop hoods, liquid ammonia source, liquid ammonia vaporizing means, and means for delivering said ammonia vapor to said hoods, the improvement in which the liquid ammonia vaporizing means comprises, in combination, (a) a heat exchanger of unitary construction comprising a horizontal cylindrical shell having an entrance and an exit, (b) a quench chamber within the entrance portion of said shell, (c) a tube bundle in the remaining portion of said shell, formed of a single elongated tube with longitudinal fins and a plurality of turns, each turn rising higher in the bundle than the preceding turn, said tube entering the shell from the bottom and leaving the shell at the top, means connecting said tube at the bottom with said ammonia source, means connecting said tube at the top with said ammonia delivering means, (d) a gas burner communicating with said quench chamber and adapted to deliver combustion gas to said quench chamber, and (e) an air blower communicating with said quench chamber and adapted to deliver ambient air to said quench chamber.

References Cited by the Examiner

UNITED STATES PATENTS

| | | | |
|---|---|---|---|
| 659,623 | 10/1900 | Mallet et al. | 122—367 X |
| 1,723,955 | 8/1929 | Shepherd. | |
| 1,953,275 | 4/1934 | Straitz | 122—356 X |
| 1,980,301 | 11/1934 | Stewart | 122—248 |
| 2,143,259 | 1/1939 | Clarkson | 122—250 X |
| 2,171,941 | 9/1939 | Millard | 122—356 |
| 2,288,569 | 6/1942 | Mason. | |
| 2,350,876 | 6/1944 | Clarkson | 122—250 |
| 2,359,219 | 9/1944 | Jones | 62—52 X |
| 2,675,682 | 4/1954 | Dobson | 62—50 X |
| 2,682,728 | 7/1954 | Nisbet. | |
| 2,977,715 | 4/1961 | Lindsay | 47—1 X |
| 2,987,259 | 6/1961 | Lindquist | 122—250 X |
| 3,095,298 | 6/1963 | Fisher. | |

(Other references on following page)

FOREIGN PATENTS 536,585  5/1941  Great Britain.

OTHER REFERENCES

Hansen, C. M.: Engineering Principles in Handling Liquid Materials, in Agricultural Engineering (magazine), 39(9) pp. 546–551, September 1958, S671, A3.

Farm Journal, August, 1961, vol. 85, No. 8, page 32, article "Crops and Soils, Defoliate Cotton with NH3." (Southwestern Edition.)

FREDERICK L. MATTESON, JR., *Primary Examiner.*
THEODORE G. CRAVER, *Examiner.*

UNITED STATES PATENT OFFICE
CERTIFICATE OF CORRECTION

Patent No. 3,238,670                                March 8, 1966

Harry L. Mahl, Jr., et al.

It is hereby certified that error appears in the above numbered patent requiring correction and that the said Letters Patent should read as corrected below.

In the grant, lines 3 and 4, for "assignors to W. R. Grace & Co., of New York, N. Y., a corporation of Connecticut," read -- assignors, by mesne assignments, to Chevron Research Company, a corporation of Delaware, --; line 13, for "W. R. Grace & Co., its successors" read -- Chevron Research Company, its successors --; and in the heading to the printed specification, lines 5 and 6, for "assignors to W. R. Grace & Co., New York, N. Y., a corporation of Connecticut" read -- assignors, by mesne assignments, to Chevron Research Company, a corporation of Delaware --.

Signed and sealed this 5th day of September 1967.

(SEAL)
Attest:

ERNEST W. SWIDER                                EDWARD J. BRENNER
Attesting Officer                              Commissioner of Patents